(12) United States Patent
Kanakubo et al.

(10) Patent No.: US 6,737,843 B2
(45) Date of Patent: May 18, 2004

(54) PWM SWITCHING REGULATOR AND ELECTRONIC APPARATUS

(75) Inventors: Yoshihide Kanakubo, Chiba (JP); Atsuo Fukui, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/354,570

(22) Filed: Jan. 30, 2003

(65) Prior Publication Data

US 2003/0169026 A1 Sep. 11, 2003

(30) Foreign Application Priority Data

Feb. 1, 2002 (JP) ............................ 2002-025636
Jan. 8, 2003 (JP) ............................ 2003-002149

(51) Int. Cl.[7] .............................................. G05F 1/40
(52) U.S. Cl. .................................................... 323/282
(58) Field of Search ................... 323/282, 283, 323/284, 285, 351

(56) References Cited

U.S. PATENT DOCUMENTS

| | | | |
|---|---|---|---|
| 4,506,216 A | * 3/1985 | Fukamachi et al. | 324/166 |
| 5,955,902 A | * 9/1999 | Takada et al. | 327/116 |
| 6,078,170 A | * 6/2000 | Sudo | 323/282 |
| 6,204,649 B1 | * 3/2001 | Roman | 323/282 |
| 6,313,616 B1 | * 11/2001 | Deller et al. | 323/282 |
| 6,346,801 B1 | * 2/2002 | Zafarana et al. | 323/284 |
| 6,430,070 B1 | * 8/2002 | Shi et al. | 363/97 |
| 6,515,460 B1 | * 2/2003 | Farrenkopf | 323/272 |

* cited by examiner

Primary Examiner—Adolf Berhane
(74) Attorney, Agent, or Firm—Adams & Wilks

(57) ABSTRACT

The present invention provides a PWM switching regulator circuit capable of reducing power consumption while it is operated under a light load. When load condition is changed from a heavy load to a light load, an internal oscillation frequency is changed from a first oscillation frequency to a second oscillation frequency lower than the first oscillation frequency, while when the load condition is changed from the light load to the heavy load, the internal oscillation frequency is returned from the second oscillation frequency back to the first oscillation frequency in accordance with an ON/OFF ratio of a signal used to control a switch of a PWM switching regulator circuit.

6 Claims, 2 Drawing Sheets

PWM SWITCHING REGULATOR AND ELECTRONIC APPARATUS

BACKGROUND OF THE INVENTION

1. Field of the Invention

The present invention relates in general to a PWM (pulse width modulation) switching regulator which is capable of changing an internal oscillation frequency into a known oscillation frequency in accordance with load condition to reduce power consumption and to enhance efficiency.

2. Description of the Related Art

A conventional PWM switching regulator circuit is usually operated at a fixed internal oscillation frequency irrespective of load condition. For example, there is known a control circuit for use in a PWM switching regulator shown in a circuit diagram of FIG. 4 (for example, refer to JP 11-155281 A (page. 4 and FIG. 1)).

The operation of the conventional PWM switching regulator controlling circuit will hereinbelow be described with reference to FIG. 4. An error amplifying circuit 102 amplifies a signal exhibiting a difference between a voltage signal Va which has been obtained by dividing a detected voltage signal Vout at an output terminal with bleeder resistors 100 and 101 and a voltage signal Vref outputted from a reference voltage circuit 106 to output the resultant signal in the form of an output voltage signal Verr. Then, a comparison circuit 103 compares a triangular wave Vosc outputted from an oscillator 104 and the level Verr of the output signal with each other to output the resultant signal in the form of a pulse signal EXT used to control an external switch through a buffer 105 to thereby carry out the control in such a way that the terminal voltage Vout becomes a desired constant output voltage. The outputted pulse signal EXT shows an ON/OFF state at the same cycle as that of an internal oscillation frequency Vosc because of the fixed internal oscillation frequency Vosc.

As described above, in an example of the circuit of the PWM switching regulator, since the internal oscillation frequency is usually fixed, the buffer is also usually operated at the same frequency as the internal oscillation frequency, and the external switch is also operated at the same frequency as the internal oscillation frequency to thereby carry out the control in such a way that the output voltage Vout becomes the desired constant voltage. In addition, since the PWM switching regulator is operated so as to hold the output voltage constant by repeatedly turning ON/OFF of the external switch, the noise having the same frequency as the oscillation frequency is contained in the output voltage.

However, since the PWM switching regulator usually oscillates at the same oscillation frequency, a filter for removing the noise having the oscillation frequency is provided in the output voltage line to allow the noise to be readily removed so that the stable power source can be readily obtained.

However, in the conventional PWM switching regulator, the oscillation circuit, the buffer and the external switch are operated at the fixed frequency irrespective of the condition of a load connected to the output terminal. For this reason, there is encountered a problem in that if the load connected to the output terminal supplying the voltage Vout becomes light, then a quantity of power consumed in the PWM switching regulator controlling circuit becomes more than that consumed in the load, which results in the remarkably deteriorated efficiency. The circuits which mainly consume the power in the PWM switching regulator controlling circuit are the internal oscillation circuit and the buffer which is operated at the same frequency as the internal oscillation frequency.

SUMMARY OF THE INVENTION

In the light of the foregoing, the present invention has been made in order to solve the above-mentioned problem associated with the prior art, and it is, therefore, an object of the present invention to provide a PWM switching regulator with which an internal oscillation frequency of a PWM switching regulator controlling circuit is halved while the switching regulator is operated under a light load to nearly halve the power consumption of the PWM switching regulator controlling circuit to thereby obtain the high efficiency even while the switching regulator is operated under a light load. Thus, the feature of the present invention is that even the respect, as the advantage of a PWM switching regulator, that the noise contained in the output voltage is readily removed is not injured since an oscillation frequency is held at a known value.

A PWM switching regulator controlling circuit according to the invention of the present application includes: an oscillation circuit for generating an oscillation signal for a PWM switching regulator; a first pulse generator for receiving as its input the signal from the oscillation circuit to output a signal PULSE-MIN; and a second pulse generator for receiving as its input the signal from the oscillation circuit to output a signal PULSE-MAX. In addition, the PWM switching regulator controlling circuit further includes: a comparison circuit for comparing the signal from the oscillation circuit with a reference signal from a reference voltage circuit to output a signal Vcomp used to control an external switch; and a logical circuit for receiving as its input the signal PULSE-MIN, the signal PULSE-MAX, and the signal Vcomp to output a signal used to control an oscillation frequency of the oscillation circuit.

Further, in the PWM switching regulator controlling circuit, the logical circuit includes: an S/R latch circuit; a first Exclusive-OR circuit for receiving as its input the signal Vcomp and the signal PULSE-MIN to output a signal; and a second Exclusive-OR circuit for receiving as its input the signal Vcomp and the signal PULSE-MAX to output a signal. In addition, the logical circuit further includes: a second AND circuit for receiving as its input the output signal from the first Exclusive-OR circuit and the output signal from the second Exclusive-OR circuit to output a signal; a third AND circuit for receiving as its output the output signal from the second AND circuit and the output signal from the S/R latch circuit to output a signal Fup to a reset terminal of the S/R latch circuit; and a buffer circuit for receiving the signal Vcomp to output a signal EXT used to control an external switch. Further, the first AND circuit, in response to the output signal from the first Exclusive-OR circuit and the signal PULSE-MIN, outputs a signal Fdown to a set terminal of the S/R latch circuit, and the output signal from the S/R latch circuit is inputted to the oscillation circuit.

The PWM switching regulator controlling circuit according to the invention of the present application includes: an oscillation circuit for generating an oscillation signal for a PWM switching regulator; a comparator for receiving as its input the oscillation signal from the oscillation circuit and an output signal obtained by comparing a voltage signal obtained through division of a voltage Vout with a reference voltage of a reference voltage circuit in an error amplifying circuit to output a signal Vcomp used to control an external switch signal; and a logical circuit for receiving as its input the signal Vcomp to output a signal used to control an oscillation frequency of the oscillation circuit.

Further, in the PWM switching regulator controlling circuit, the logical circuit includes: an S/R latch circuit; a first time integrating circuit for receiving as its input the signal Vcomp to integrate a period of time during which an external switch signal is in an OFF-state to output a signal Fdown; and a second time integrating circuit for receiving as its input the signal Vcomp to integrate a period of time during which the external switch signal is an ON-state to output a signal Fup, and the output signal from the first time integrating circuit is inputted to a set terminal of the S/R latch circuit, the output signal from the second time integrating circuit is inputted to a reset terminal of the S/R latch circuit, and the output signal from the S/R latch circuit is inputted to the oscillation circuit.

In the PWM switching regulator controlling circuit according to the invention of the present application, when load condition is changed from a heavy load to a light load, an internal oscillation frequency is adapted to be changed from a first oscillation frequency to a second oscillation frequency lower than the first oscillation frequency, while when the load condition is changed from the light load to the heavy load, the internal oscillation frequency is adapted to be returned from the second oscillation frequency back to the first oscillation frequency in accordance with an ON/OFF ratio of a signal used to control a switch of a PWM switching regulator circuit.

In the PWM switching regulator controlling circuit according to the invention of the present application, a switch adapted to be switched in accordance with a light load and a heavy load is provided in a PWM switching regulator circuit, and when load condition is changed from the heavy load to the light load, an internal oscillation frequency is adapted to be changed from a first oscillation frequency to a second oscillation frequency lower than the first oscillation frequency by switching the switch, while when load condition is changed from the light load to the heavy load, the internal oscillation frequency is adapted to be returned from the second oscillation frequency back to the first oscillation frequency by switching the switch.

A PWM switching regulator according to the invention of the present application includes the PWM switching regulator controlling circuit according to a first or third aspect of the present invention.

An electronic apparatus according to the invention of the present application includes the PWM switching regulator.

An ON/OFF ratio (duty ratio) of a signal used to control an external switch of the PWM switching regulator is changed in accordance with load condition. Thus, an internal oscillation frequency is changed into a known oscillation frequency when the switching regulator is operated under a light load in accordance with the ON/OFF ratio.

BRIEF DESCRIPTION OF THE DRAWINGS

The above and other objects as well as advantages of the present invention will become clear by the following description of preferred embodiments of the present invention with reference to the accompanying drawings, wherein.

DESCRIPTION OF THE PREFERRED EMBODIMENTS

The preferred embodiments of the present invention will hereinafter be described in detail with reference to the accompanying drawings.

Figure 1:
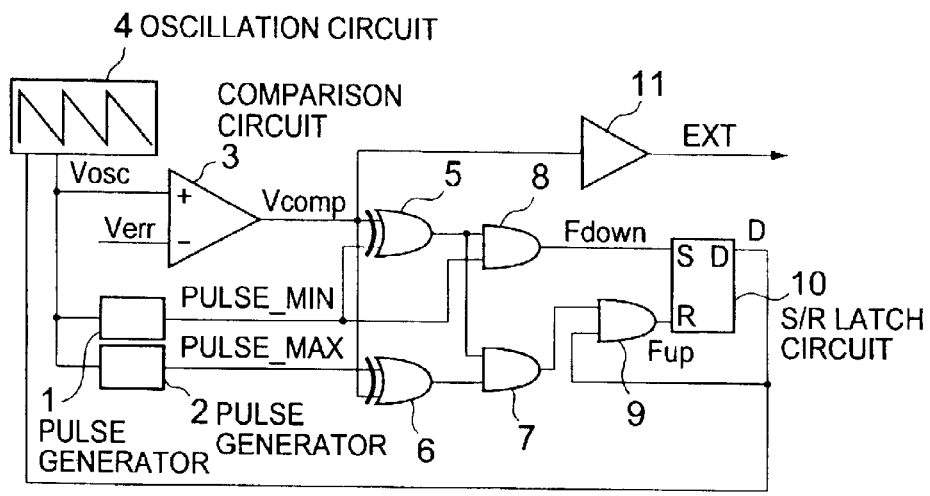
FIG. 1 is a circuit diagram, partly in block diagram, showing a configuration of a PWM switching regulator controlling circuit according to a first embodiment of the present invention.

FIG. 1 is a circuit diagram, partly in block diagram, showing a configuration of an internal circuit of a PWM switching regulator controlling circuit according to a first embodiment of the present invention. A signal Vosc outputted from a conventional oscillation circuit 4 and a signal Verr outputted from an error amplifying circuit are inputted to a comparison circuit 3 which outputs in turn a control signal Vcomp used to control an external switch through a buffer circuit 11. In the present embodiment of the invention, an oscillation frequency of the signal Vosc is controlled in accordance with an ON/OFF ratio of the waveform of the signal Vcomp using pulse generating circuits 1 and 2 which are operated synchronously with the signal Vosc, Exclusive-OR circuits 5 and 6, and AND circuits 7, 8 and 9.

Figure 2:
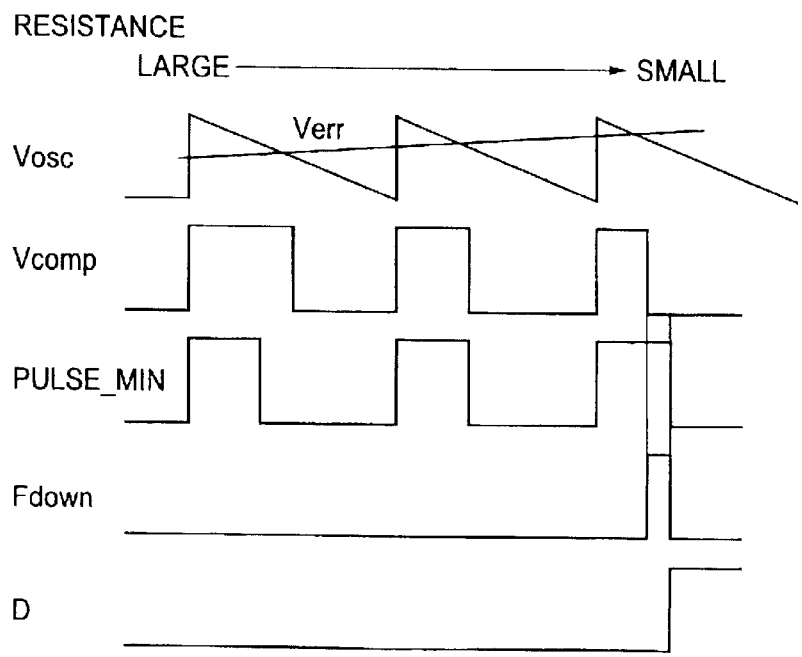
FIG. 2 is a timing chart useful in explaining the operation of the PWM switching regulator controlling circuit shown in FIG. 1.

Next, the operation of the PWM switching regulator controlling circuit according to the first embodiment of the present invention will hereinbelow be described in detail with reference to FIG. 2. Referring to FIG. 2, the Exclusive-OR circuit 5 receives as its input a pulse signal PULSE MIN outputted from the pulse generating circuit 1 and a signal Vcomp outputted from the comparison circuit 3 to output a signal exhibiting a difference therebetween in the form of a rectangular wave. Then, the AND circuit 8 arithmetically operates a logical product of the inputted rectangular wave and the pulse signal PULSE MIN to output a resultant pulse signal Fdown exhibiting the logical product. That is to say, when the level of the signal Vcomp and the level of the pulse signal PULSE MIN are compared with each other, if it is judged that the level of the pulse signal PULSE MIN is larger than that of the signal Vcomp, then the pulse signal Fdown is outputted. Since an ON-time period of the signal Vcomp becomes shorter as the load is further reduced, when the level of the signal Vcomp and the level of the pulse signal PULSE MIN are compared with each other, it is judged that the level of the pulse signal PULSE MIN is larger than that of the former, so that the pulse signal Fdown is outputted. The pulse signal Fdown thus outputted is inputted to a set terminal of an S/R latch 10. Upon input of the pulse signal at the level "H" to the set terminal of the S/R latch 10, a pulse signal at the level "H" is outputted through a data terminal to be inputted to an oscillation circuit to thereby halve the frequency of the oscillation circuit. With the circuit shown in FIG. 1, it is possible to realize the circuit in which if the load becomes light, then an oscillation frequency is halved to reduce the power consumption.

In addition, in the case where the load condition is changed from a light load to a heavy load, similarly to the case where the load condition is changed from the heavy load to the light load, the Exclusive-OR circuit 6 receives as its input the pulse signal PULSE MAX outputted from the pulse generating circuit 2 and the signal Vcomp outputted from the comparison circuit 3 to output the signal exhibiting a difference therebetween in the form of a rectangular wave. Then, the AND circuit 7 arithmetically operates a logical product of the outputted rectangular wave and the signal Vcomp. Then, if the pulse signal at the level "H" is outputted through a data terminal D of the S/R latch, then a pulse signal Fup will be generated. That is to say, when the level of the signal Vcomp and the level of the pulse signal PULSE MAX are compared with each other, if it is judged that the level of the signal Vcomp is larger than that of the pulse signal PULSE MAX, then the pulse signal Fup will be outputted. Since an ON-time period of the signal Vcomp becomes longer as the load is further increased, when the level of the signal Vcomp and the level of the pulse signal PULSE MAX are compared with each other, it is judged that the level of the signal Vcomp is higher than that of the latter, so that the pulse signal Fup will be outputted. The pulse signal Fup thus outputted is inputted to a reset terminal of the SIR latch 10. If the pulse signal at the level "H" is inputted to the reset terminal of the S/R latch 10, then a pulse signal at the level "L" is outputted through the data terminal D to be inputted to the oscillation circuit so that the frequency of the oscillation circuit is doubled to be returned back to the conventional oscillation frequency. With the circuit shown in FIG. 1, if the load becomes heavy, then the oscillation frequency is doubled to allow the conventional operation to be carried out.

In the above description, the concrete configuration of the oscillation circuit 4 is omitted. However, if an oscillation circuit includes a constant current source and a capacitor, then a constant current value is halved with the pulse signal D outputted through the data terminal D of the S/R latch 10 to allow a half oscillation frequency to be readily generated. Also, even when the capacitance value is changed, the same result is obtained. In addition thereto, the present invention can be implemented even by carrying out such a frequency division operation with a CR oscillation circuit, a frequency dividing circuit and the like.

While in the present embodiment, the description has been given with respect to a specific case where only one latch is provided, two latches may also be provided. In this case, when the load is further reduced, the oscillation frequency is halved to allow the power consumption to be further reduced. As a result, it is possible to provide a high-efficiency PWM switching regulator.

In addition, in the above-mentioned embodiment of the present invention, the description has been given with respect to a specific case where a known oscillation frequency is halved. However, even in the case where the frequency dividing ratio such as 1/3 or 1/4 is adopted, an oscillation frequency is changed into a known oscillation frequency when the switching regulator is operated under a light load so as to meet the object of the present invention, whereby the power consumption while the switching regulator is operated under a light load can be reduced to enhance the efficiency. Thus, the same effects can be offered.

Figure 3:
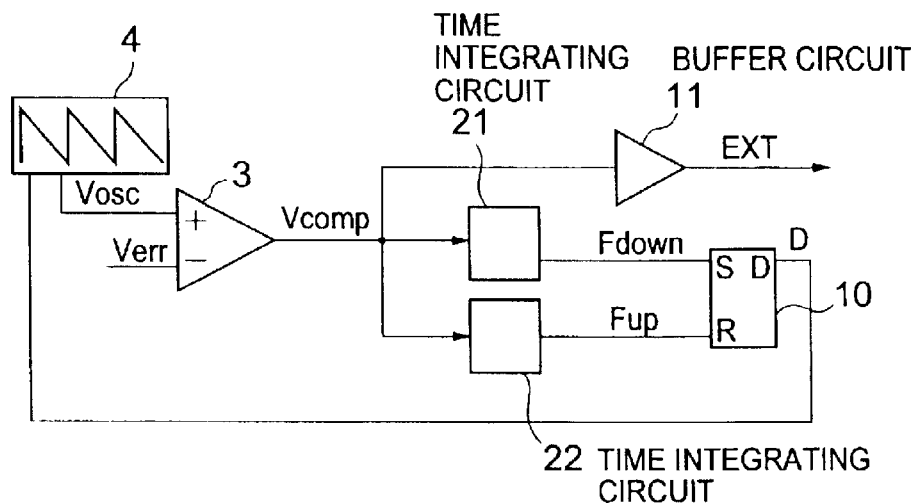
FIG. 3 is a circuit diagram, partly in block diagram, showing a configuration of a PWM switching regulator controlling circuit according to a second embodiment of the present invention.
Figure 4:
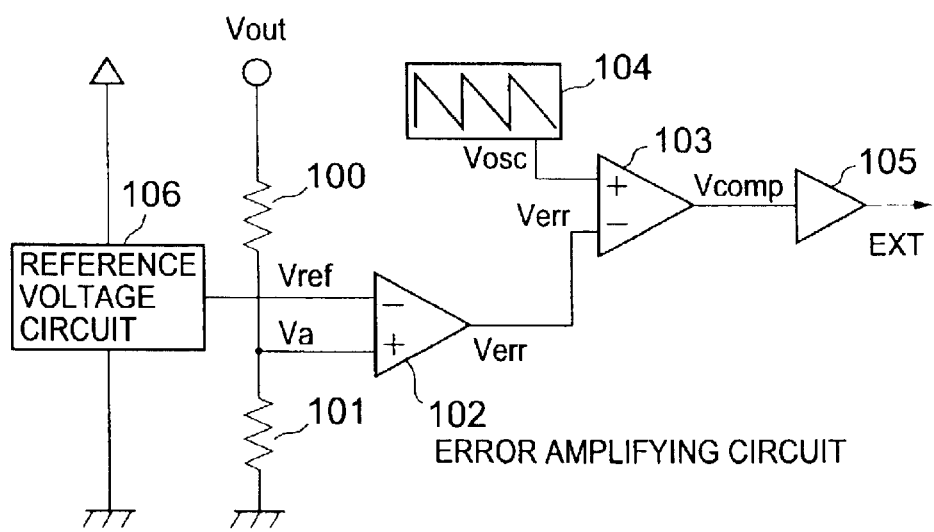
FIG. 4 is a circuit diagram showing a configuration of a conventional PWM switching regulator controlling circuit.

Next, a PWM switching regulator controlling circuit according to a second embodiment of the present invention will hereinbelow be described with reference to FIG. 3. Referring to FIG. 3, there are provided a first time integrating circuit 21 and a second time integrating circuit 22 which are operated in accordance with the signal Vcomp outputted from the comparison circuit 3. For example, when the PWM switching regulator controlling circuit is operated at a normal oscillation frequency, the load becomes light to prolong a period of time during which the signal EXT used to drive an external switch of the switching regulator is in an OFF-state. Then, the first time integrating circuit 21 integrates the turn-OFF time of the external switch. When the turn-OFF time of the external switch continues to some degree, an output pulse signal Fdown from the first time integrating circuit 21 goes "H" with the level thereof to be inputted to a set terminal of the S/R latch which outputs in turn an output pulse signal at the level "H". The output pulse signal of the S/R latch goes "H" with the level thereof to be inputted to the oscillation circuit 4 to thereby halve the frequency of the oscillation circuit 4. With the circuit shown in FIG. 3, it is possible to realize the circuit in which if the load becomes light, then the oscillation frequency is halved to reduce the power consumption.

In addition, when the load condition is changed from the light load to the heavy load, the load becomes heavy to prolong a period of time during which the signal EXT used to drive the external switch of the switching regulator is in an ON-state. Then, the second time integrating circuit 22 integrates the turn-ON time of the external switch. When the turn-ON time of the external switch continues to some degree, the output pulse signal Fup of the second time integrating circuit goes "H" with the level thereof to be inputted to the reset terminal of the S/R latch which outputs in turn an output pulse signal at the level "L". That is to say, since an ON-time period of the signal Vcomp is further prolonged as the load becomes heavier, the second time integrating circuit 22 is operated to generate the pulse signal Fup which is in turn inputted to the reset terminal of the S/R latch 10. Upon input of the pulse signal at the level "H" to the reset terminal of the S/R latch 10, an output pulse signal at the level "L" is outputted through the data terminal to be inputted to the oscillation circuit 4, so that the frequency of the oscillation circuit 4 is doubled to be returned back to the conventional oscillation frequency. Consequently, in the second embodiment as well, similarly to the first embodiment, the internal oscillation frequency of the switching regulator can be changed in accordance with the load condition to reduce the power consumption.

Now, a third embodiment will hereinbelow be described. There is an apparatus in which a difference in power consumption between a calling mode and a standby mode in a mobile phone or the like, for example, may become large depending on the operation on the apparatus side in some cases. Since if the much power is consumed during the calling mode, while no power is consumed during the standby mode, then the situation of use of the power will become obvious, a quantity of power consumption can be grasped on the apparatus side. For this reason, a switch is provided in a switching regulator and is switched on the apparatus side to thereby change an internal oscillation frequency of the switching regulator in accordance with a quantity of power consumption similarly to the first and second embodiments. The switch in the switching regulator is switched in accordance with a quantity of power consumption on the apparatus side to thereby change the internal oscillation frequency. Then, in the case of the heavy load condition, the oscillation is carried out at a first oscillation frequency, while in the case of the light load condition after switching the switch, the oscillation frequency is changed from the first oscillation frequency to a second oscillation frequency lower than the first oscillation frequency, which results in that the power consumption of the switching regulator is suppressed to realize the promotion of reduction in power consumption. In the third embodiment as well, similarly to the above-mentioned first and second embodiments, the internal oscillation frequency of the switching regulator is changed in accordance with the load condition to reduce the power consumption.

Now, in the first embodiment of the present invention, the oscillation frequency is made changeable using the circuit for comparing an ON/OFF ratio of the output signal from the comparison circuit with the reference pulse signal to detect the change in load. By the way, it is obvious that the comparison with the reference pulse signal can be carried out not at the output stage of the comparison circuit, but at the output stage of the buffer circuit or the like, and thus the same effects as those of the circuit of the present invention can be obtained even in other logical circuits. From the foregoing, the present invention does not refer only to the circuit configuration shown in FIG. 1.

In the second embodiment as well, similarly to the first embodiment, the load condition is judged on the basis of the turn-ON time and the turn-OFF time of the outside transistor using the internal time integrating circuits to change the oscillation frequency. However, a turn-ON time and a turn-OFF time of the outside transistor can also be judged on the basis of the voltage level of the signal Verr. The second embodiment aims at changing the oscillation frequency in the case where the turn-ON time or the turn-OFF time is long, and hence the second embodiment does not refer only to the circuit configuration shown in FIG. 3.

A PWM switching regulator having a PWM switching regulator controlling circuit according to the present invention as described above can be operated with higher efficiency. In addition, an electronic apparatus having the PWM switching regulator can be operated more efficiently.

As set forth hereinabove, according to the present invention, there are offered the effects that in the PWM switching regulator controlling circuit, the internal oscillation frequency can be changed into a known oscillation frequency in accordance with load condition, which results in the reduction in power consumption and the enhancement of efficiency. In addition, a PWM switching regulator having the PWM switching regulator controlling circuit according to the present invention as described above can be operated with higher efficiency. Also, an electronic apparatus having the PWM switching regulator can be operated more efficiently.

While the present invention has been particularly shown and described with reference to the preferred embodiments and the specified modifications thereof, it will be understood that the various changes and other modifications will occur to those skilled in the art without departing from the scope and true spirit of the invention. The scope of the invention is, therefore, to be determined solely by the appended claims.

What is claimed is:

1. A PWM switching regulator, comprising:
   an oscillation circuit for generating an oscillation signal for the PWM switching regulator;
   a first pulse generator for receiving as its input the signal from the oscillation circuit to output a signal PULSE-MIN;
   a second pulse generator for receiving as its input the signal from the oscillation circuit to output a signal PULSE-MAX;
   a comparison circuit for comparing the signal from the oscillation circuit with a reference signal from a reference voltage circuit to output a signal Vcomp used to control an external switch; and
   a logical circuit for receiving as its input the signal PULSE-MIN, the signal PULSE-MAX, and the signal Vcomp to output a signal used to control an oscillation frequency of the oscillation circuit.

2. A PWM switching regulator according to claim 1, the logical circuit comprising:
   an S/R latch circuit;
   a first Exclusive-OR circuit for receiving as its input the signal Vcomp and the signal PULSE-MIN, for output a signal;
   a second Exclusive-OR circuit for receiving as its input the signal Vcomp and the signal PULSE-MAX, for output a signal;
   a second AND circuit for receiving as its input the output signal from the first Exclusive-OR circuit and the output signal from the second Exclusive-OR circuit to output a signal;
   a third AND circuit for receiving as its output the output signal from the second AND circuit and the output signal from the S/R latch circuit to output a signal Fup to a reset terminal of the S/R latch circuit; and
   a buffer circuit for receiving the signal Vcomp to output a signal EXT used to control an external switch,
   wherein the first AND circuit, in response to the output signal from the first Exclusive-OR circuit and the signal PULSE-MIN, outputs a signal Fdown to a set terminal of the S/R latch circuit, and the output signal from the S/R latch circuit is inputted to the oscillation circuit.

3. An electronic apparatus comprising the PWM switching regulator according to claim 1.

4. A PWM switching regulator, comprising:
   an oscillation circuit for generating an oscillation signal for the PWM switching regulator;
   a comparator for receiving as its input the oscillation signal from the oscillation circuit and an output signal obtained by comparing a voltage signal obtained through division of a voltage Vout with a reference voltage of a reference voltage circuit in an error amplifying circuit to output a signal Vcomp used to control an external switch signal; and
   a logical circuit for receiving as its input the signal Vcomp to output a signal used to control an oscillation frequency of the oscillation circuit.

5. A PWM switching regulator according to claim 4, the logical circuit comprising:
   an S/R latch circuit;
   a first time integrating circuit for receiving as its input the signal Vcomp to integrate a period of time during which an external switch signal is in an OFF-state to output a signal Fdown; and
   a second time integrating circuit for receiving as its input the signal Vcomp to integrate a period of time during which the external switch signal is an ON-state to output a signal Fup,
   wherein the output signal from the first time integrating circuit is inputted to a set terminal of the S/R latch circuit, the output signal from the second time integrating circuit is inputted to a reset terminal of the S/R latch circuit, and the output signal from the S/R latch circuit is inputted to the oscillation circuit.

6. An electronic apparatus comprising the PWM switching regulator according to claim 4.

* * * * *